US009657827B2

(12) United States Patent
Gopal et al.

(10) Patent No.: US 9,657,827 B2
(45) Date of Patent: May 23, 2017

(54) TORQUE LIMITING DIFFERENTIAL

(71) Applicant: Eaton Corporation, Cleveland, OH (US)

(72) Inventors: Suraj Gopal, Bengaluru (IN); Pradeep Yuvraj Chavan, Pune (IN); Patrick John McMillan, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/577,673

(22) Filed: Dec. 19, 2014

(65) Prior Publication Data

US 2015/0107933 A1   Apr. 23, 2015

Related U.S. Application Data

(63) Continuation of application No. PCT/US2014/016372, filed on Feb. 14, 2014.

(60) Provisional application No. 61/894,544, filed on Oct. 23, 2013.

(51) Int. Cl.
*F16H 48/08* (2006.01)
*F16H 48/24* (2006.01)
*F16H 48/20* (2012.01)

(52) U.S. Cl.
CPC ............. *F16H 48/24* (2013.01); *F16H 48/08* (2013.01); *F16H 2048/207* (2013.01)

(58) Field of Classification Search
CPC ..... F16H 48/08; F16H 48/24; F16H 2048/207
USPC ........................................ 475/220, 231, 331
See application file for complete search history.

(56) References Cited

U.S. PATENT DOCUMENTS

| 4,273,006 | A | 6/1981 | Woodbury | |
| 5,273,498 | A * | 12/1993 | Dhillon | F16H 48/08 475/230 |
| 6,551,209 | B2 | 4/2003 | Cheadle et al. | |
| 6,802,793 | B2 * | 10/2004 | Zink | F16H 48/08 475/230 |
| 7,264,569 | B2 | 9/2007 | Fox | |
| 7,744,500 | B2 | 6/2010 | Donofrio | |
| 8,021,260 | B2 | 9/2011 | Homan | |
| 2005/0187063 | A1* | 8/2005 | Haruki | F16H 48/08 475/231 |
| 2007/0179008 | A1* | 8/2007 | Fusegi | F16H 48/08 475/231 |
| 2007/0197338 | A1* | 8/2007 | Fusegi | F16H 48/08 475/231 |

(Continued)

OTHER PUBLICATIONS

International Search Report mailed Sep. 19, 2014 for PCT/US2014/016372, pp. 1-3.

(Continued)

*Primary Examiner* — Roger Pang
(74) *Attorney, Agent, or Firm* — Mei & Mark LLP

(57) ABSTRACT

A selectively lockable differential, comprising a plurality of torque sensitive pins, an outer housing, a first side gear comprising first gear teeth, a second side gear comprising second gear teeth, a pinion shaft, two pinion gears rotationally coupled to the pinion shaft, each pinion gear comprising pinion gear teeth coupled to the first gear teeth and the second gear teeth, and a collar comprising collar teeth for selectively engaging the gear lugs of the first side gear, the torque sensitive pins operatively coupling the collar to the outer housing.

22 Claims, 21 Drawing Sheets

(56) References Cited

U.S. PATENT DOCUMENTS

| | | | | |
|---|---|---|---|---|
| 2008/0015076 A1* | 1/2008 | Fusegi | ................... | F16H 48/08 475/252 |
| 2009/0048055 A1* | 2/2009 | Corless | .................. | F16H 48/08 475/230 |
| 2010/0317480 A1* | 12/2010 | Cochren | ............ | F16H 55/0846 475/220 |
| 2013/0079187 A1 | 3/2013 | Edler | | |

OTHER PUBLICATIONS

Written Opinion of the International Searching Authority mailed Sep. 19, 2014 for PCT/US2014/016372, pp. 1-8.

* cited by examiner

TORQUE LIMITING DIFFERENTIAL

This is a continuation of Application No. PCT/US2014/016372, filed Feb. 14, 2014, which claims the benefit of U.S. provisional application Ser. No. 61/894,544, filed Oct. 23, 2013, which are incorporated herein by reference in their entireties.

FIELD

This application relates to torque limiting devices, and more specifically to locking differentials comprising a torque limiting device.

BACKGROUND

Vehicle drivelines may include differential devices to split torque to wheels to adjust the traction of each wheel during vehicle operation. At times it is advantageous to fully lock the driveline to transmit undifferentiated torque. In this fully locked condition, it is possible to transmit 100% of the torque available on a ring gear. If an axle shaft isn't designed to withstand this high torque, it will fail. This can damage additional axle components and the differential itself.

SUMMARY

The methods and devices disclosed herein overcome the above disadvantages and improves the art by way of a selectively lockable differential, which may comprise a plurality of torque sensitive pins; an outer housing; a first side gear comprising first gear teeth and gear lugs; a second side gear comprising second gear teeth; a pinion shaft; two pinion gears rotationally coupled to the pinion shaft, each pinion gear comprising pinion gear teeth coupled to the first gear teeth and the second gear teeth; and a collar comprising collar teeth for selectively engaging the gear lugs of the first side gear, the collar being operatively coupled to the outer housing by the torque sensitive pins.

In addition, a vehicle driveline may comprise a torque transmission system operatively coupled to transmit torque from an engine to a selectively lockable differential. The selectively lockable differential may comprise a plurality of torque sensitive pins, an outer housing, a first side gear comprising first gear teeth and gear lugs, a second side gear comprising second gear teeth, and a pinion shaft. two pinion gears may be rotationally coupled to the pinion shaft. Each pinion gear may comprise pinion gear teeth coupled to the first gear teeth and the second gear teeth. A collar may comprise collar teeth for selectively engaging the gear lugs of the first side gear. The collar may be operatively coupled to the outer housing by the torque sensitive pins. A first axle may be operatively coupled to the first side gear, and a second axle may be operatively coupled to the second side gear.

The collar further can comprise coupling ears and the differential can further comprise a collar housing coupled to the torque sensitive pins, the collar housing comprising coupling recesses for receiving the coupling ears, the collar housing at least partially surrounding the collar.

The differential may comprise an actuator and push rods, wherein the actuator is configured to selectively push the push rods towards the collar, and when the push rods push the collar, the coupling ears slide in the coupling recesses and the collar teeth engage with the gear lugs.

The differential may comprise an actuator and push rods, wherein the actuator selectively pushes the push rods towards the collar, and when the actuator pushes the push rods towards the collar, the collar slides in the outer housing and the collar teeth engage with the gear lugs.

Each torque sensitive pin may comprise a head with a threaded portion and a body with a smooth portion, wherein the outer housing comprises a plurality of threaded openings, wherein each of the plurality of threaded openings receives a corresponding threaded portion of one of the plurality of torque sensitive pins, wherein the collar further comprises a plurality of collar holes, wherein each of the plurality of collar holes receives a corresponding smooth portion of one of the plurality of torque sensitive pins, and wherein the collar is slidable on the smooth portions to selectively engage and disengage the gear lugs and the collar teeth.

In a further preferred embodiment, the collar housing further comprises a plurality of holes, wherein each hole receives a corresponding one of the plurality of torque sensitive pins, wherein the differential further comprises a plurality of pin springs, and wherein each hole houses a corresponding one of the plurality of pin springs in abutment with the corresponding torque sensitive pin. Further preferably, each torque sensitive pin comprises a head with a threaded portion and a body with a smooth portion, wherein the outer housing comprises a plurality of threaded openings, wherein each of the plurality of threaded openings receives a corresponding threaded portion of one of the plurality of torque sensitive pins, wherein each collar housing hole receives a corresponding smooth portion of one of the plurality of torque sensitive pins, and wherein the pin springs are biased to push the smooth portions out of the holes.

Each torque sensitive pin can comprise a head, a neck, and a body, and the neck has a diameter that enables the pin to shear at the neck before any other location on the torque sensitive pin.

Each torque sensitive pin can comprise at least a head interfaced with a body, wherein the distance between the outer housing and the collar is selected to ensure that each torque sensitive pin shears in an area at or near the interface of the head and the body, and wherein, when the torque sensitive pins shear, the collar is rotatable in the outer housing.

Each torque sensitive pin may comprise at least a head interfaced with a body, wherein the distance between the outer housing and the collar housing is selected to ensure that each torque sensitive pin shears in an area at or near the interface of the head and the body, and wherein, when the torque sensitive pins shear, the collar housing is rotatable in the outer housing.

When the differential receives torque, each torque sensitive pin may be configured to shear before the collar teeth or first gear teeth yield.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" and "front" and "back" are for ease of reference to the figures and are not meant to be limiting.

Figure 1:
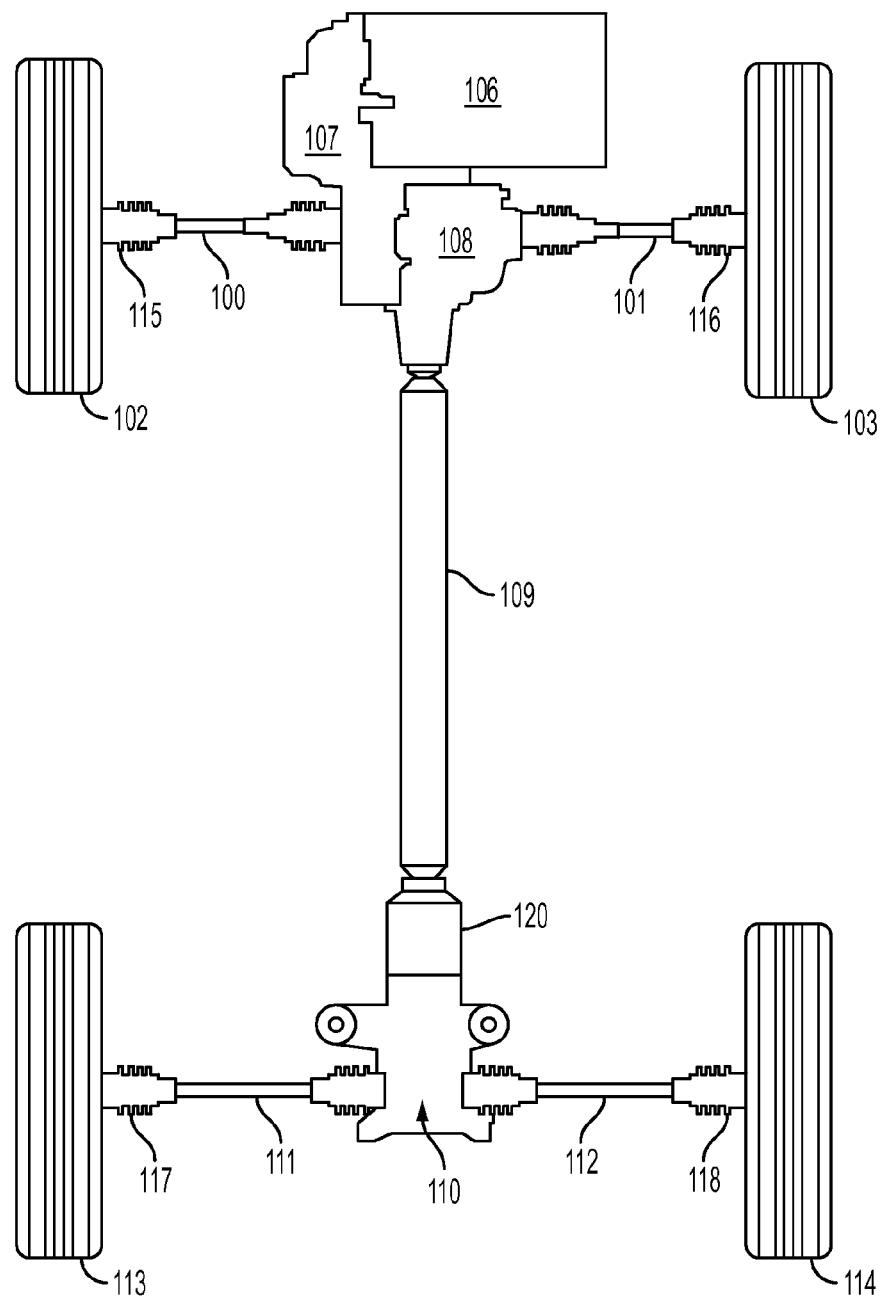
FIG. 1 is a schematic example of a simplified vehicle driveline.

FIG. 1 illustrates one example of a vehicle driveline. In this example, the vehicle is front wheel drive, meaning the primary motive power is connected to the front drive axle. The engine 106, transmission 107, and power transfer unit 108 are operatively connected at the front of the vehicle to transmit torque directly to a front left axle 100, and front right axle 101. Via wheel hubs 115 and 116, wheels 102 and 103 receive torque to provide traction to the vehicle. Via mechanisms in the power transfer unit 108, such as a hypoid gear and pinion, the drive shaft 109 receives torque and transmits it to the rear of the vehicle. An optional all-wheel drive coupling 120 connects to the drive shaft 109, and a rear drive unit 110 may house an electronic coupling component and rear differential.

The rear differential may be operated in either an open or locked mode. In the open mode, the left rear wheel 113, via wheel hub 117 and left rear axle 111, can spin at a speed that is different from the right wheel 114. Likewise, the right rear wheel 114, via wheel hub 118 and right rear axle 112, can spin at a different speed than left rear wheel 113. In the locked mode, both left and right rear wheels 113 and 114 receive the same torque because the left and right rear axle 111 and 112 are locked via internal components in the rear differential.

It should be noted that the driveline of FIG. 1 is an example, only, and the principles claimed herein may be used in a rear wheel drive vehicle, or in a vehicle having more than one differential device.

The engine 106 can supply a range of rotative power that can be reduced or enhanced via gear reductions or additions. The engine power is received as torque in the axles of the vehicle, and, as axles are typically hollow, the axles can only receive torque up to a limit, and then the axle is subject to failure such as shearing or torsion. Therefore, axles are typically designed with an Axle Torque Capacity ("ATC"), which is the maximum engine torque multiplied by the highest gear ratio which is the highest numerical value of either first or reverse gear multiplied by the final drive ratio between the hypoid/drive pinion and ring gear. In the open differential mode, the ATC is split 50:50 to each axle. So, each axle receives 0.5×ATC.

However, if the differential is locked, it can be possible to transmit 100% of the available torque to a single axle such that the axle receives 1.0×ATC. Because of unpredictable use events or end-user abuse, upgrading the axle may not be enough to prevent failure. And, end-users may choose a lower capacity axle in view of competing considerations such as CAFE requirements, added weight, additional footprint for associated components, and overall operational costs. Because of the trade-offs, expense, and complications associated with upgrading axle shafts to a higher strength than is needed for typical operational ranges, it is difficult to completely prevent the axle from failing in the locked differential mode. Even when the axle is at 100% of ATC, it is possible to overload the axle shaft thereby leading to failure.

A torque limiting device as disclosed herein can preserve the integrity of the axle during high torque conditions. That is, the torque limiting device is designed to sacrifice itself before the axle shaft failure occurs. Such a limiting device can shear and return the differential to open mode, thus relieving the axle of excess torque before the axle shears or suffers torsion. The shearing of the torque limiting device can also prevent corollary damage to the axle components and to the differential itself. For example, in semi float type axles, the axle should stay within the housing even if the differential fails. If the torque limiting device shears, the vehicle returns to open mode and the vehicle is still operational despite an inability to return the differential to locked mode.

Within the gear chamber 213 is a differential gear set including a pair of input pinion gears 217. The pinion gears 217 comprise the input gears of the differential gear set, and are in meshing engagement with a pair of side gears 219 and 221. When the ring gear, fixed to the right hand case 211, spins, the pinion shaft 218 spins with it. This in turn spins the side gears 219 and 221. The side gears 219 and 221 include sets of internal, straight splines 223 and 225, respectively, which are in splined engagement with mating external splines on respective left and right rear axle shafts 111 and 112. Thus, as the ring gear rotates, the rear axles rotate.

When the differential operates in an open mode, during normal, straight ahead operation of the vehicle, no differentiation occurs between the left and right axles 111 and 112, or between the left and right side gears 219 and 221, and therefore, the pinion gears 217 do not rotate relative to the pinion shaft 218. As a result, the left and right hand gear case 212 and 211, the pinion gears 217, and the side gears 219 and 221 all rotate about an axis of rotation A, as if comprising a solid unit. However, if the vehicle turns or experiences turbulence that causes the rear wheels 113 and 114 to spin at different rates, the pinion gears 217 rotate around the pinion shaft 218 and 216 to enable different side gear speeds with respect to the pinion shaft rotation.

Figure 2:
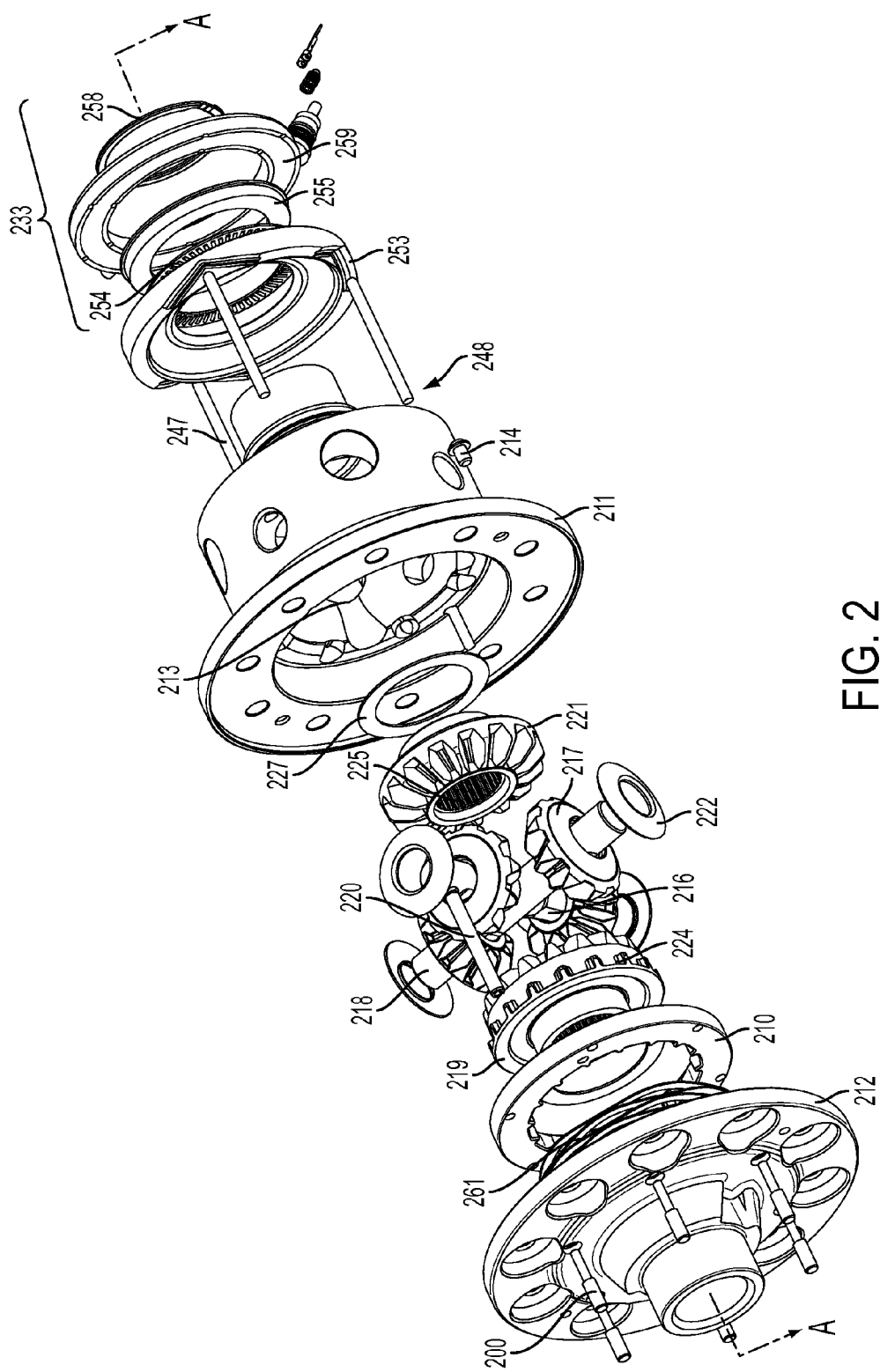
FIG. 2 is an exploded view of a first embodiment of a torque limiting differential.
Figure 3:
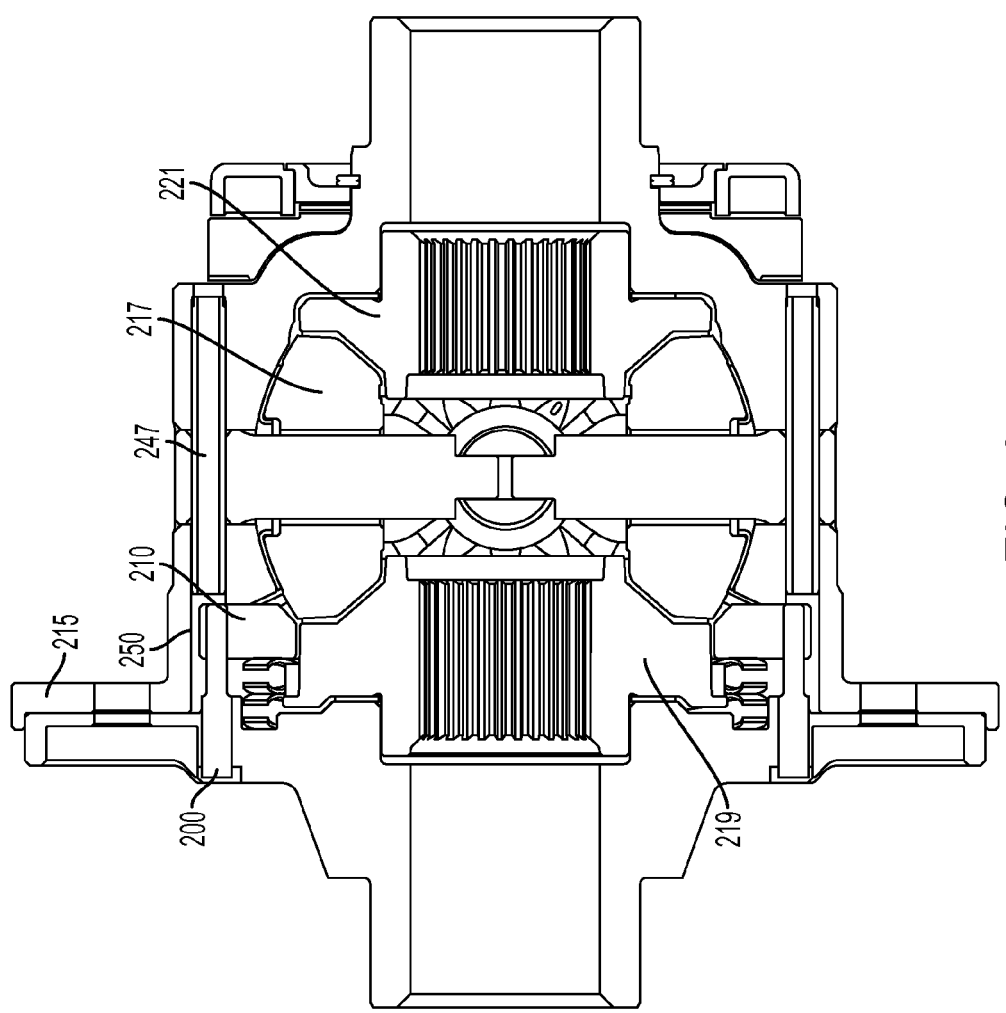
FIG. 3 is a cross-section of the first embodiment along a first plane.
Figure 4:
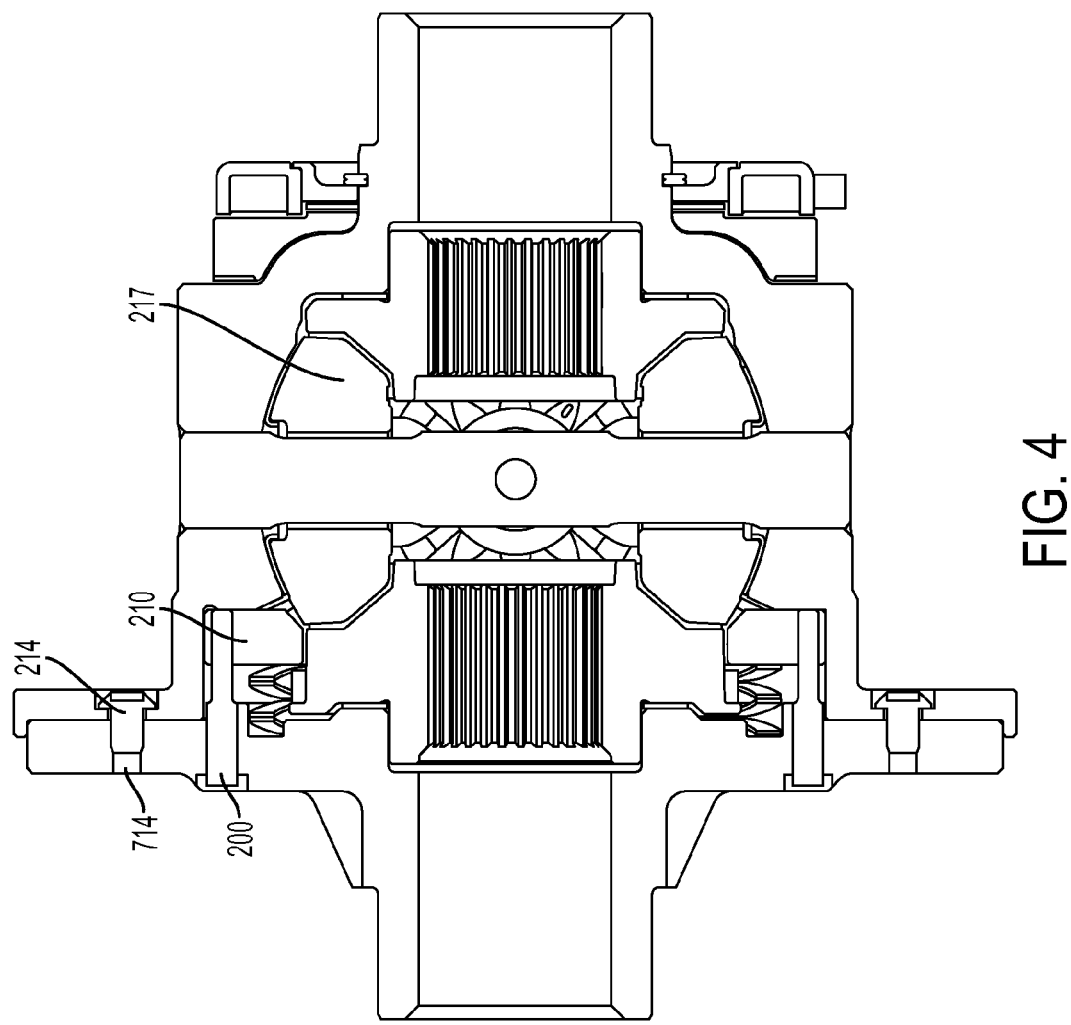
FIG. 4 is a second cross-section of the first embodiment along a second plane.

However, it is sometimes advantageous to lock the left and right rear axles 111 and 112 so that they must spin at the same rate. Thus, during the locked mode, a side gear is locked to the housing so that it must rotate with the pinion shaft 218. In the example of FIG. 2, the left side gear 219 is locked. Via the meshing engagement, this locks the pinion gears 217 with respect to side gear 219, which also locks the side gear 221.

Figure 10:
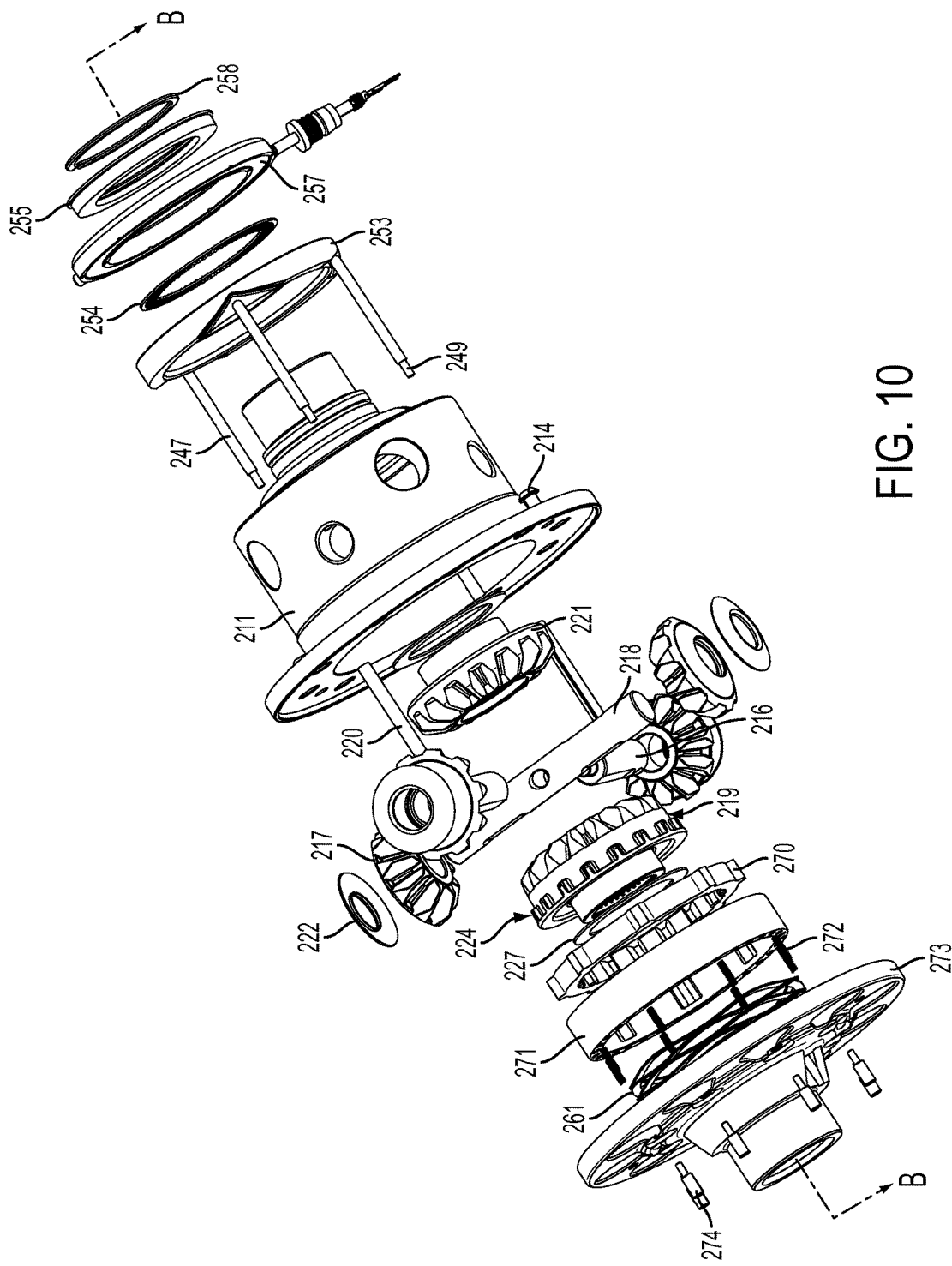
FIG. 10 is an exploded view of a second embodiment of a torque limiting differential.

As above, the locked mode can generate a lot of strain on the various parts, including the axles, gears, wheel hubs and locking mechanisms. The strain can lead to damage to the vehicle parts, loss of vehicle control, or loss of operability. Thus, the locking mechanism (collar) of FIG. 2 is operatively provided with at least one, preferably six to eight, torque limiting devices designed to fail in lieu of other driveline parts. And, the collar (lock plate) of FIG. 10 is operatively provided with at least one, preferably six to eight, torque limiting devices via a surrounding collar housing.

The torque limiting devices shear before a rear axle 111 or 112 fails and before the locking mechanisms themselves fail. That is, the torque limiting devices will fail when the design limits are reached. The torque limiting devices are used under a pure shear condition when the differential is locked. That is, the torque load acts directly on the torque limiting devices, causing a clean shearing of the devices instead of a gradual or shattering break of the devices.

There are several classes of differentials, one of which is an E-locker, or electronic locking differential. In one prior design, such as U.S. Pat. No. 7,264,569, the collar has ears that mate with recesses in the right hand case. The prior art collar rotates with the case and slides against the case to move between locked and unlocked mode. The collar may be pressed by push rods to lock against a left hand side gear. The collar then rotates with the left hand case, right hand case, left and right locker gears, and pinion gears in a locked mode. In open mode, the collar rotates with case but does not lock the side gears to the pinion gears, and the axles are able to rotate at different speeds.

In the example shown in the first embodiment of FIG. 2, the lock collar (lock plate) 210 does not have coupling ears to couple to the right or left hand case 211 or 212. Instead, lock collar receives torque limiter pins (torque sensitive pins) 200 to operatively couple to the left hand case 212. Lock collar rotates with the left hand case 212 so long as the torque sensitive pins 200 are intact. If the lock collar 212 experiences torque above a predetermined value, the lock collar 212 may rotate and shear the torque sensitive pins 200. Once the torque sensitive pins 200 shear, the lock collar 210 is free to rotate in right hand case 211 and the lock collar 210 cannot maintain the locked differential mode. That is, the differential can only operate in the open mode once the torque sensitive pins 200 shear.

The torque flow path from the drive shaft through to the right and left rear axles is as follows. The drive shaft 109 typically terminates with an input pinion that couples to a ring gear. The ring gear is usually around the exterior of the differential case. In the example of FIG. 2, the ring gear is around right hand case 211 and couples to a flange 215 via openings 715 and 1815. When the input pinion rotates the ring gear, the whole differential of FIG. 2 rotates. Because central pinion shaft 218 passes through the right hand case 211, it rotates as the ring gear rotates. The ring gear connection to the input pinion of the drive shaft is not shown for clarity, nor is the ring gear shown. An additional housing may surround the ring gear and its coupling to the input pinion.

The left hand case 212 is coupled to the left rear axle 111 and the right hand case is coupled to the right rear axle 112. Through mountings not shown, the left rear axle 111 can rotate with respect to the left hand case 212, and the right rear axle 112 can rotate with respect to the right hand case 211. The torque from the ring gear is applied to the central pinion shaft 218 to spin it. Central pinion shaft 218 passes through two pinions 217. In open mode, the pinions 217 are able to rotate around the central pinion shaft 218. Additional short cross shafts 216 may couple to the pinion shaft (long cross shaft) 218. The short cross shafts 216 may enable additional pinions 217 to rotate within the differential. The short cross shafts 216 may couple to the left hand case 212 via slotted spring pins 220. The central pinions 217 of the differential may additionally interface with spherical washers 222.

The pinions 217 meshingly engage with side gears. The right hand side gear 221 has internal splines 223 to couple to right hand rear axle 112, and the left hand side gear (locker gear) 219 has internal splines to couple to left hand rear axle 111.

So when the pinion shaft 218 rotates, the side gears 219 and 221 rotate and thus the rear axles 111 and 112 rotate. In an unlocked, or open, mode, each side gear can rotate at a different speed than the other side gear because the side gears can turn with respect to the pinions 217 at different rates of speed. In the locked mode, the locker gear (left hand side gear) 219 is coupled to the lock collar (lock plate) 210, which is coupled via torque sensitive pins 200 to the left hand case 212. The left hand case 212 is coupled to the right hand case 211 by lock screws 214 through openings 714 and 1814. The right hand case 211, as above, is coupled to the ring gear to turn as the drive shaft pinion applies rotational force. Because the locker gear 219 is locked via lock collar 210 to rotate with the case at the same rate as the pinion shaft 218, the right hand side gear 221 is also locked from differential rotation and must likewise rotate at the same rate as the locker gear 219. Thus each rear axle 111 and 112 rotates at the same rate via the locked differential.

Because the locked mode depends on the lock collar 210 to achieve the locked state, its uncoupling from the left hand case 212 via shearing of the torque sensitive pins 200 forces the differential to operate in an open mode only. The wave spring 261 ensures the lock collar 210 disengages from the locker gear 219 when either open mode is selected, or when torque sensitive pins 200 shear. The wave spring may seat in a wave spring recess 708 in the left hand case 212. The wave spring recess 708 may be sized to damp or prevent wave spring vibration during differential use.

Figure 7:
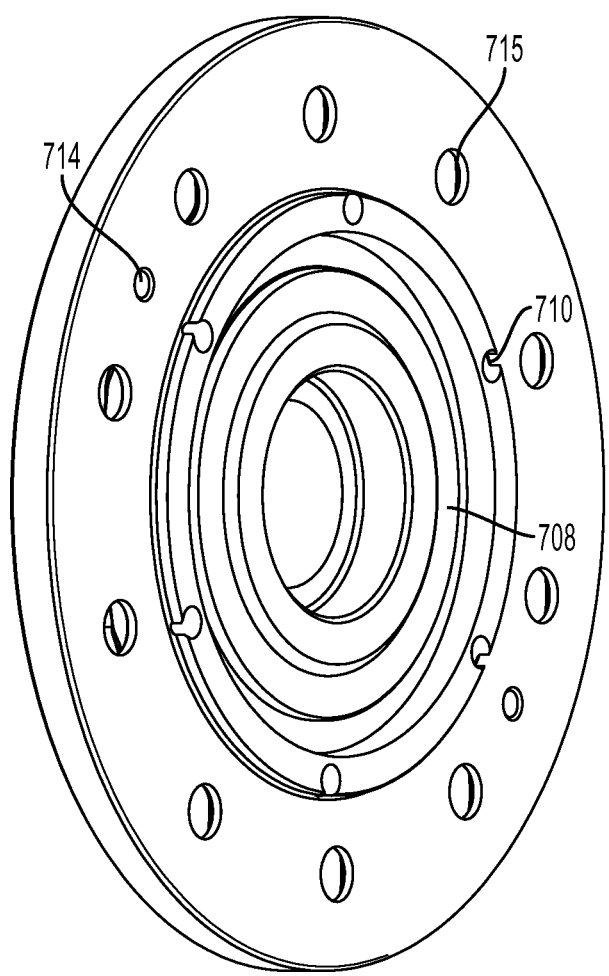
FIG. 7 is an inner-side view of the left-hand case of the first embodiment.
Figure 8:
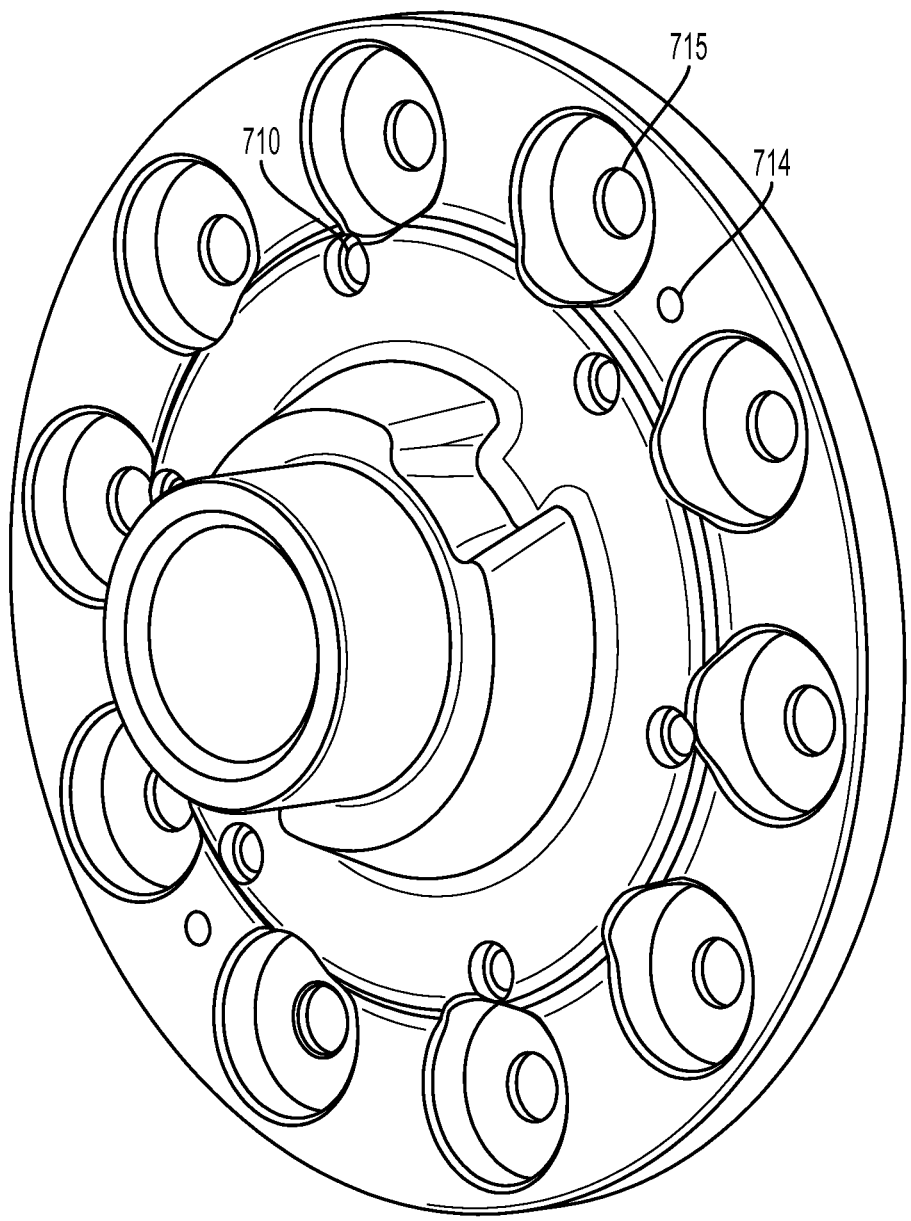
FIG. 8 is an outer-side view of the left-hand case of the first embodiment.
Figure 9:
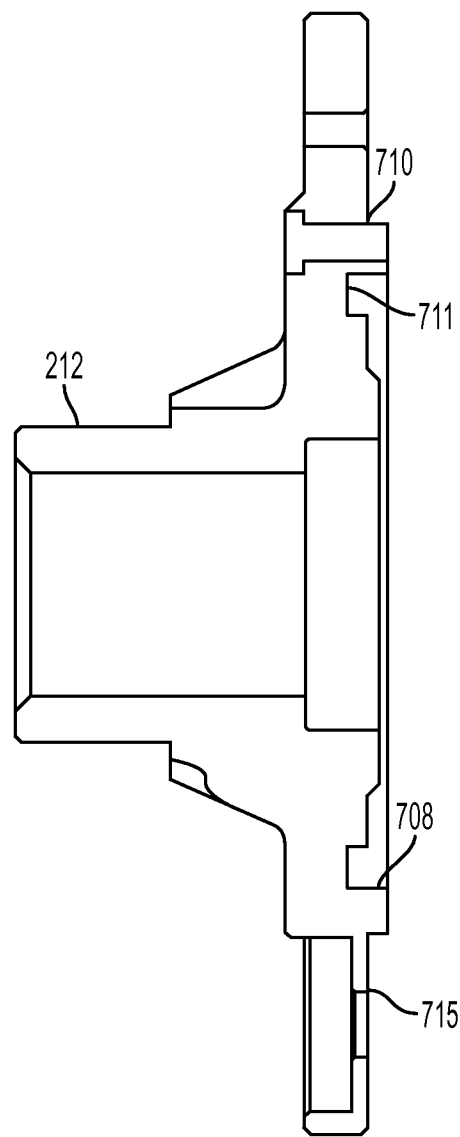
FIG. 9 is a cross-section of the left-hand case of the first embodiment.

Turning to FIGS. 7, 8, and 9, FIG. 7 illustrates an inner face of the left hand case 212, FIG. 8 illustrates an outer side of the left hand case 212, and FIG. 9 illustrates a cross section of the left hand case 212. The recess 708 has a wave spring stop 711 for seating the wave spring 261. Other openings in the left hand case 212 are discussed elsewhere in the specification.

Figure 18:
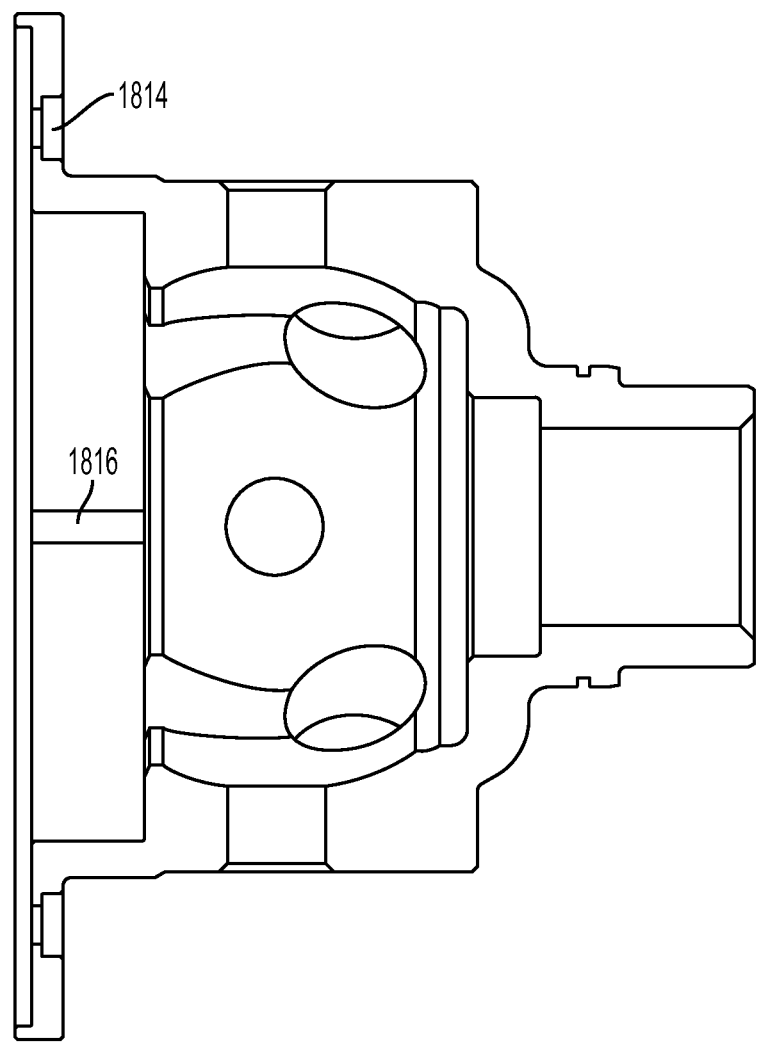
FIG. 18 is a cross-section of a right-hand case.
Figure 19:
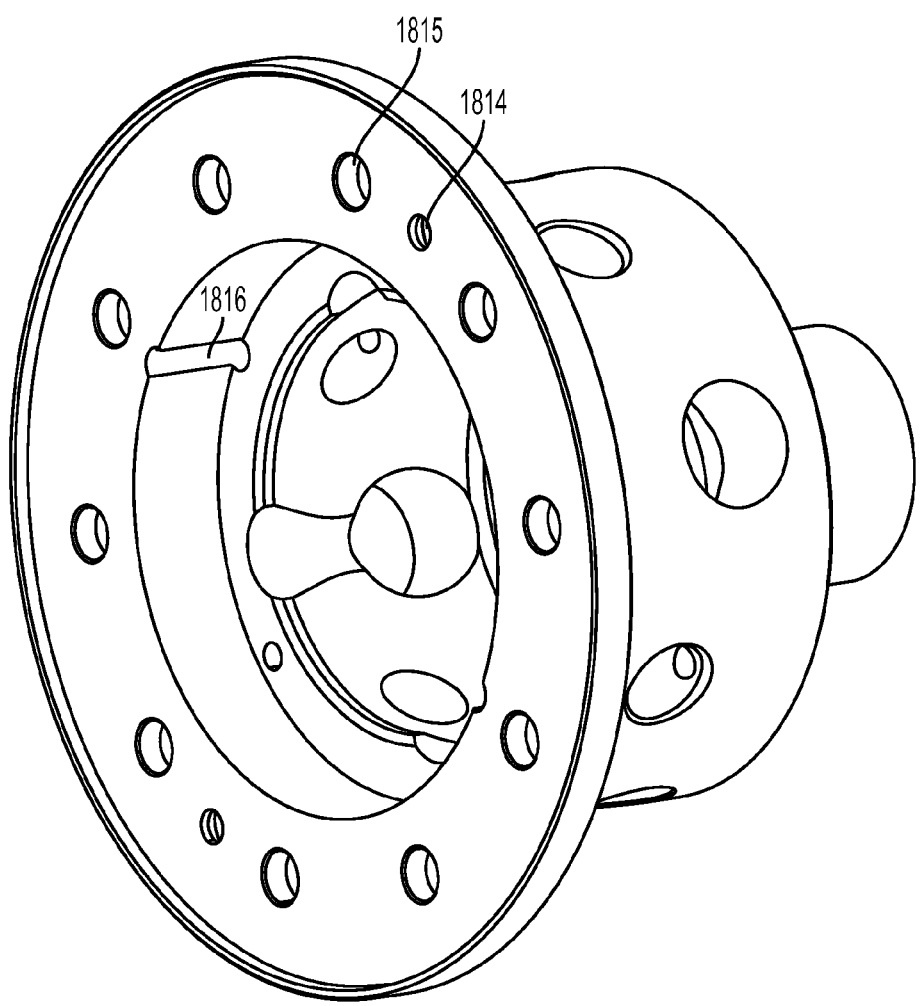
FIG. 19 is a view into the inner side of the right-hand case.

The right hand case is illustrated in more detail in FIGS. 18 and 19. In the cross-section of FIG. 18, the opening 1814 for securing the right hand case to the left hand case is visible. Also, slots 1816 are available for the slotted spring pins. Other openings in the right hand case are for various purposes not related to the torque limiting devices.

A user or an automated electronic control system can select when the differential moves between open and locked mode. An abridged actuation mechanism 233 is shown in FIG. 2. Electrical leads 259 couple to an activation switch or other control means to power stator 257. The powered or unpowered state of the stator 257 determines whether the ramp plate 253 is "ramped-up" or "ramped down." When "ramped up", the ramp plate is turned to push peak areas on the ramp plate 253 against second ends 251 of push rods 247, which urges the push rods 247 towards the lock plate 210. First ends 248 push against the lock plate 210, and the lock plate 210 slides axially in a recess 250 in the right hand case. The push rods 247 push the lock plate 210 towards the left hand case 212 and the lock plate 210 slides on the torque sensitive pins 200 that pass through holes 501 in the lock plate 210. The lock plate has collar teeth 504, each tooth having a wide end 502 and a narrow end 503. These collar teeth 504 mesh with lugs 224 to lock the lock plate 210 with respect to the locker gear 219.

In the "ramped down" position, ramp plate 253 is turned so that the push rods can rest in valleys of the ramp plate 253. Wave spring 261 can push the lock plate 210, which can in turn push the push rods 247 in to the valleys. The collar teeth 504 do not engage with lugs 224.

Figure 5:
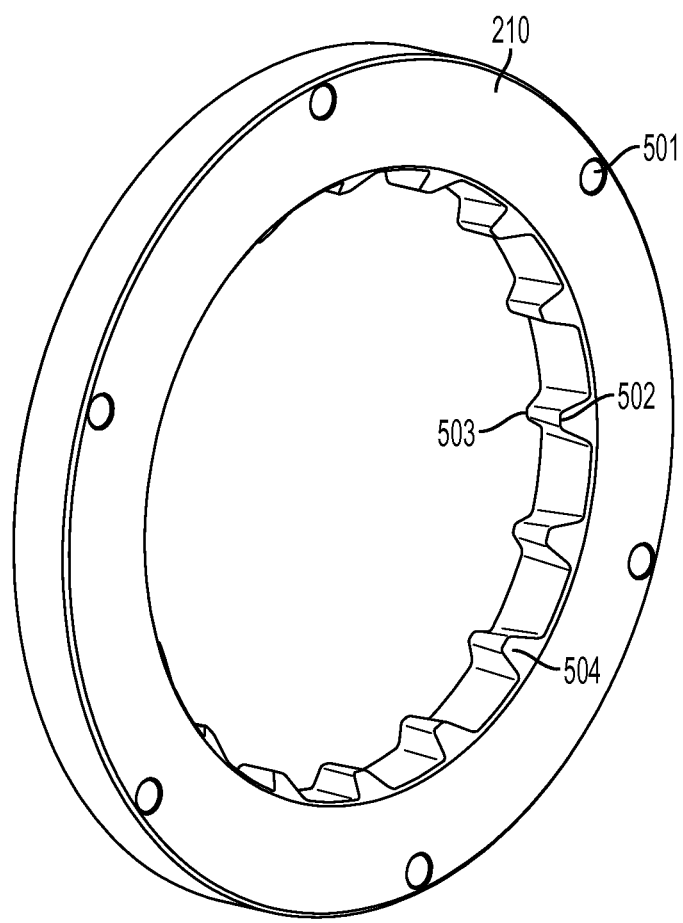
FIG. 5 is a view of a locking collar of the first embodiment.

The lock collar 210 may have a clearance surrounding the torque sensitive pins 210 to allow the lock collar 210 to slide along the pin body 202. Lubricating fluid within the differential housing may assist with lubricating the motion. In addition, while the holes 501 in the lock collar 210 are shown in FIG. 5 near an outer boundary of the lock collar, the holes 501 may be centered in the thickest face of the lock collar, or the holes may be otherwise placed radially inward from the locations illustrated.

The actuation mechanism 233 may further comprise a retaining ring 258, a bearing 254, and a bearing race 255.

The differential may also comprise shim 227 between right hand side gear 221 and right hand case 211. A like shim may be used with left hand side gear 219 and left hand case 212.

The example of FIG. 2 shows the use of 6 torque limiter pins (torque sensitive pins) 200. However, modifications can be made for fewer or additional torque limiter pins 200.

As shown in FIG. 5, the lock plate 210 has holes 501 for receiving the torque sensitive pins 200. While not shown, the holes 501 may pass deeper in to the lock plate 210 and may pass all the way through the lock plate 210. The collar teeth 504 have a draft on them. That is, the teeth have a wide end 502 and a narrow end 503. The draft helps ensure collar tooth 504 engagement with the lugs 224. The side gear lugs 224 may have a draft angle on them because of their formation method. To avoid a contact inconsistency, the lock collar 210 is also formed with a draft angle. The angles on the collar teeth and the side gear lugs may be complementary to ensure smooth meshing engagement.

Since prior lock collars are formed via impact extrusion using a die to transfer a pattern on to sheets, the collar teeth of prior designs do not have a draft. The draft on the collar teeth 504 may be formed by machining the pattern impact extruded on the lock collars, which is very expensive. Or, because the design is simplified by the removal of the collar coupling ears, the draft may be provided by way of closed die hot forging. Providing the draft on the lock collar teeth 504 at the same value as the draft on the lugs 224 enhances smooth and full engagement of the collar teeth 504 with the lugs 224. The draft angle on the collar teeth 504 may assist with preventing lock collar failure due to rounding of tooth corners and improper load sharing, or may prevent failure due to frictional resistance offered by the gear lugs to the movement of the collar teeth.

Figure 6:
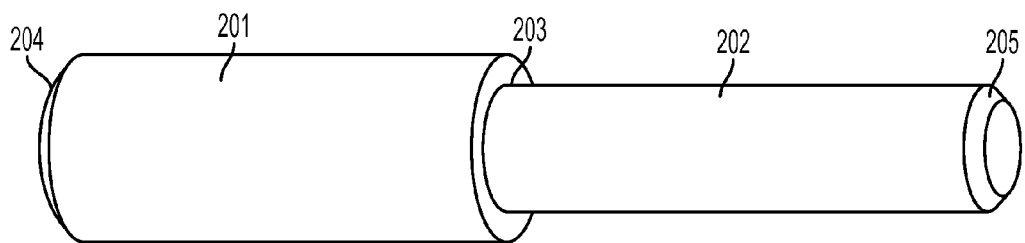
FIG. 6 is a view of a torque sensitive pin of the first embodiment.

Turning for FIG. 6, the torque sensitive pins 200 have an end face 204 that may have a notch or groove pattern (Phillips, "straight-head", or other) for screwing or unscrewing the torque sensitive pin head 201 in to the left hand case 212. While not shown, the pin head 201 is threaded and the openings 710 in the left hand case are threaded so as to fixedly couple the pin head 201 in place. Hence, the torque sensitive pin 200 comprises a head 201 with a threaded portion and a body 202 with a smooth portion. The body 202 of the torque sensitive pin 200 may terminate with a beveled end 205. A shearing zone, or neck, 203 may be between the pin head 201 and the pin body 202. The shearing zone 203 may include a groove, which may be circumferential, for ensuring the location of pin shear. The neck may also have the same diameter as the pin body.

The number and size of torque sensitive pins 200 can vary. For example, the figures show embodiments having 6 or 8 torque sensitive pins, but other numbers of pins may be used, such as 4 to 10. In addition, the ratio of the diameter of the pin body to the diameter of the pin head can vary, and the ultimate diameters of the pin heads and pin bodies can vary. The pin should shear at or near the interface of the pin head with the pin body, and the area of the shearing location 203 may be less than the area of the pin body if a groove is placed in the body, thus reducing the diameter at that location.

Figure 20:
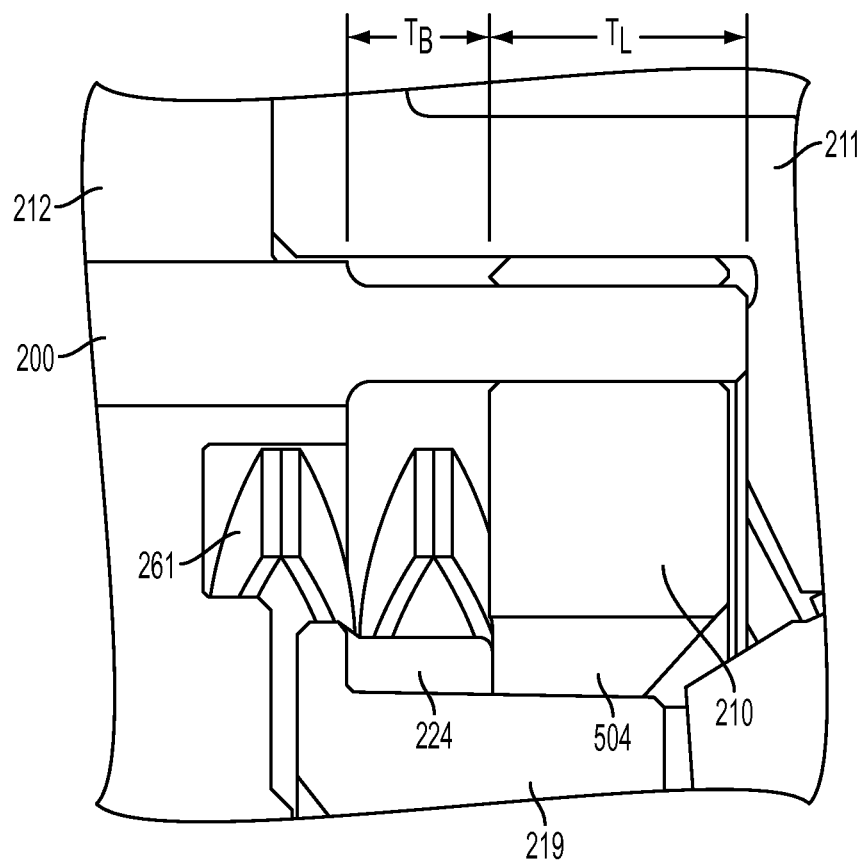
FIG. 20 is a detailed view of the torque sensitive pin interface with the lock collar.

Additional considerations arise because the lock collar 210 can receive torque load before the lock collar 210 has fully engaged the locker gear. This can create a bending stress that can differ from an ideal uniformly distributed load (UDL). So, for FIG. 20, the differential is shown in the open mode. The collar teeth 504 have not yet engaged the lugs 224 of the locker gear (side gear 219). The lock plate 210 has a thickness $T_L$ that translates along the torque sensitive pin 200. The torque sensitive pin 200 has a beam thickness $T_B$, which is the length of the pin that is exposed during the open mode.

The exposed length can experience bending stress that varies based on the percent of engagement of the collar teeth 504 with the lugs 224. As the engagement percent varies from 5% to 100%, the bending stress varies, and, as the torque sensitive pin count varies from 4 to 10 pins in the differential, the bending stress varies with the percentage of tooth 504 to lug 224 engagement.

A further modified scenario may occur if the torque pin is deflected during usage. This can occur if the load is not uniformly distributed. In such a scenario, the point load acts at on the pin at the beginning of the lock collar surface and the torque load distributions and bending stress adjust accordingly. To ensure that the load breaks the torque sensitive pin at a desired location, such as at the interface of the pin head with the pin body, a groove maybe included at the shearing zone 203. The groove diameter should be slightly less than body diameter.

Since the lock collar 210 and torque sensitive pins 200 are placed in the torque flow path, it is important that when the device fails, the debris should be contained in a location outside the flow path and such that the debris does not contaminate other internal components. Thus, the clearance between the left hand case 212 and the lock plate 210, the clearance between the lock plate and the right hand case 211, and the length of the pin body 202 may be selected to avoid travel of torque sensitive pin debris. The torque sensitive pin is also dimensioned and formed of a material that has a minimal chance of exploding or shattering into many small pieces. This assists with serviceability of the design. That is, the differential may be taken apart and the torque sensitive pins 200 may be replaced. The design is serviceable and the whole part does not always have to be scrapped upon shearing of the torque sensitive pins. However, it may be necessary to disassemble portions of the differential and the driveline to effectuate the servicing.

In a second embodiment, shown in FIG. 10, rather than dismantling the axle shafts, bearing caps, bearings, etc of the rear drive axle, the differential may be serviced to remove the torque pin head and torque pin body after removing only a housing around the pinion gear and ring gear. In this design, the torque sensitive pins couple the left hand case to a collar housing (lock plate housing), as in FIGS. 13A, 13B, thereby operatively coupling to an eared collar within the collar housing. The torque sensitive pins abut springs in the collar housing to enable the sheared pin body to be ejected during servicing. The torque sensitive pins can be replaced without scrapping the whole differential and without dismantling the drive axle and differential.

Several elements of the first embodiment appear in the second embodiment and will not be re-discussed.

Figure 17:
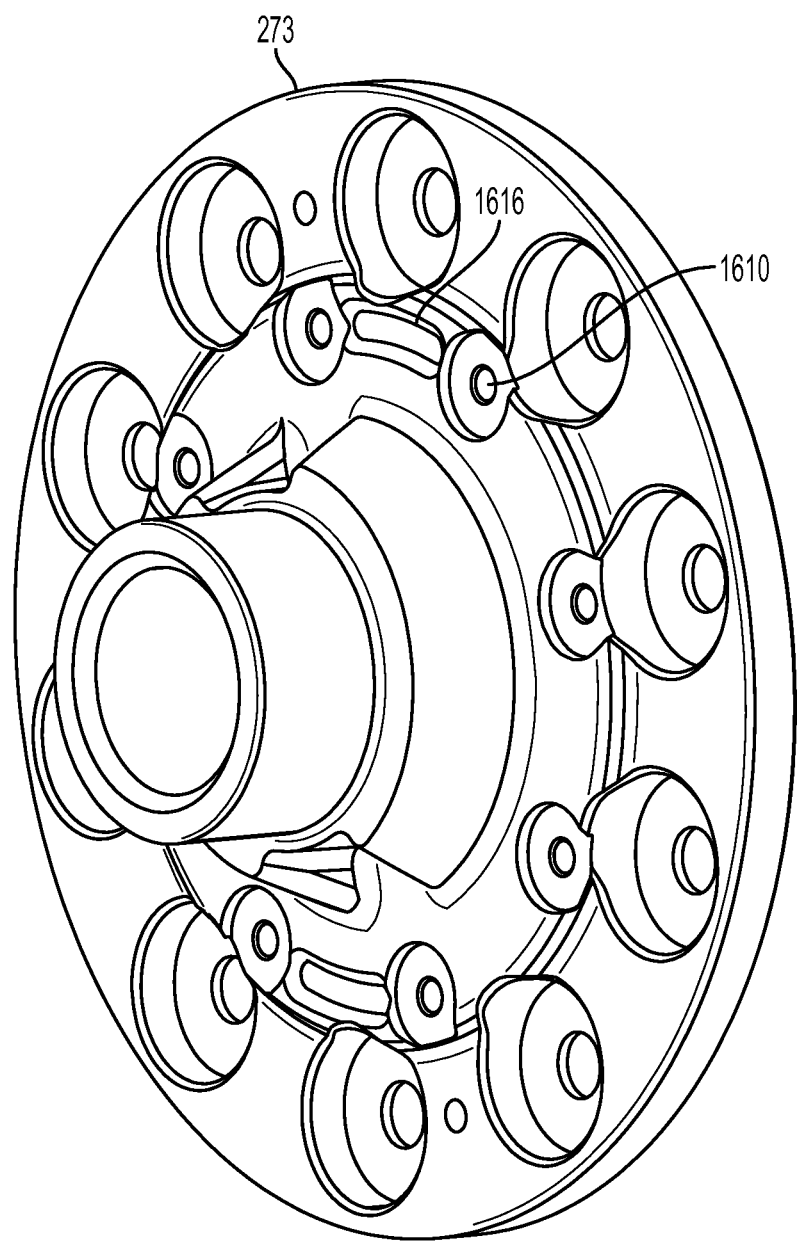
FIG. 17 is an outer-side view of the left-hand case of the second embodiment.

Turning to FIGS. 17-19, the left hand case 273 couples to the right hand case 211 via lock screws 214 through openings 1614 and 1814. As above, the coupling may use threading. Openings 1610 receive, respectively, 8 torque limiter pins (torque sensitive pins) 274. The torque limiter pins 274 are threaded to the left hand case 273. The torque limiter pins 274 pass in to lock plate housing 271 where they abut pin springs 272. The pin springs 272 may have an outer diameter equal to or less than the outer diameter of the torque limiter pins 274 to avoid having the spring wrap around the torque limiter pins 274.

A collar or lock plate 270 may reciprocate in the lock plate housing 271 to lock and unlock the differential. That is, the lock plate 270 may slide from a first position, where the differential operates in an open mode, to a second position, where the differential operates in a locked mode. As above, the ramp plate 253, push rods 247, and wave spring 261 may operate to move the lock plate 270. The first end 249 of the push rod abuts the lock plate 270.

Figure 11:
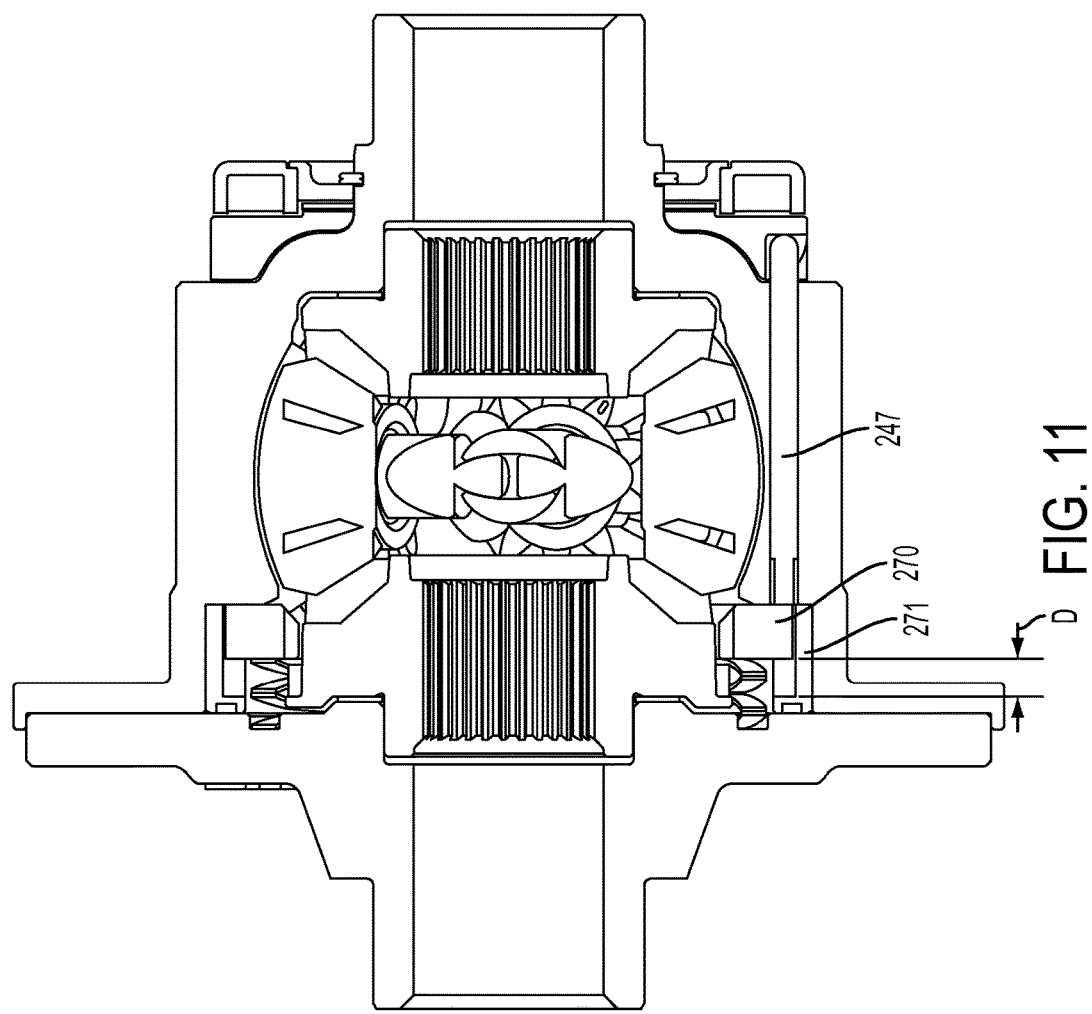
FIG. 11 is a cross-section of the second embodiment along a first plane.
Figure 12:
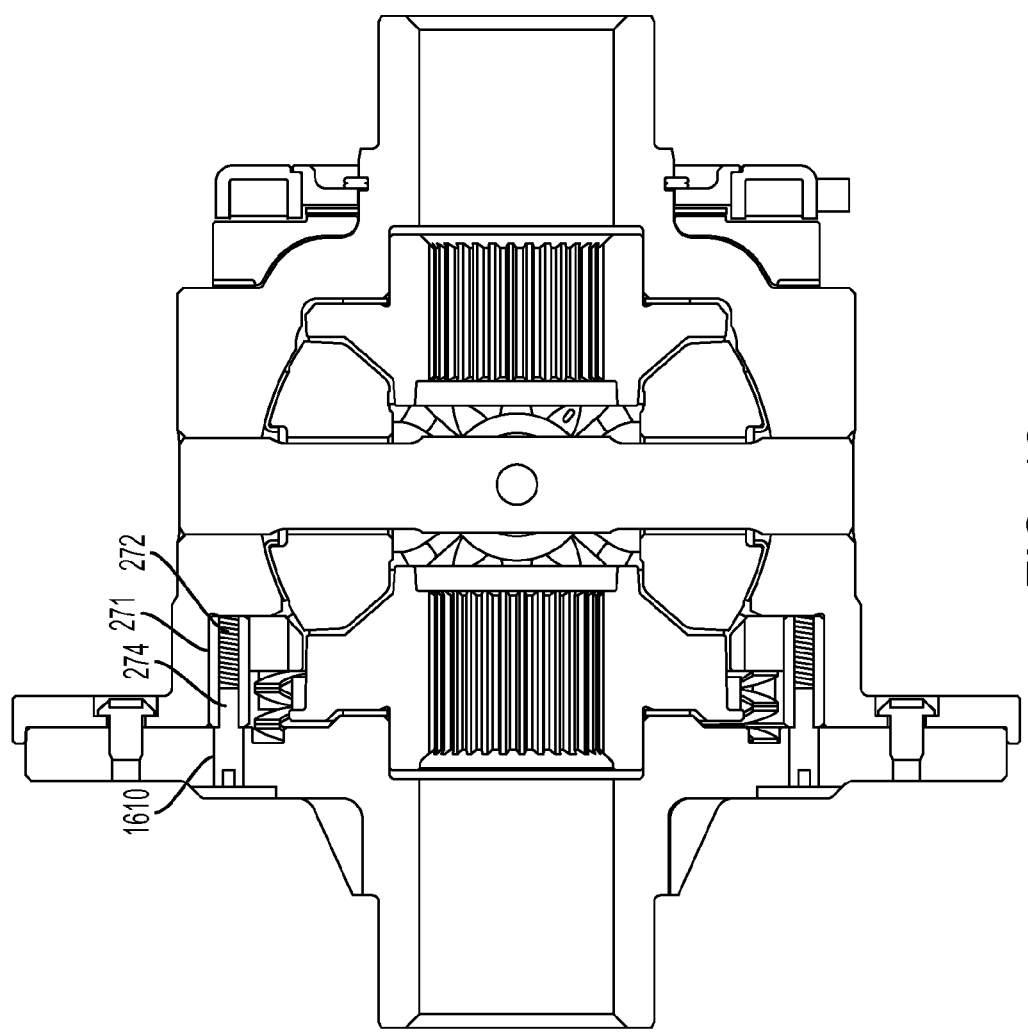
FIG. 12 is a cross-section of the second embodiment along a second plane.

FIG. 11 shows the differential of the second embodiment along a plane to illustrate the push rod 247 abutting the lock plate 270. It also illustrates that the lock plate can slide a distance D in the lock plate housing 271. FIG. 12 shows the same differential along another plane that shows the torque limiter pins 274 passing through openings 1610 in the left hand case 273. The torque limiter pins 274 pass into the lock plate housing 271 with the pin springs 272 in abutment. Since the example of FIG. 12 is not to scale, the pin springs 272 may have other dimensions, such as longer or shorter with respect to the lock plate housing 272, and the torque limiter pins 274 may have other dimensions, including a longer or shorter body length. Both figures show the lock plate 270 disengaged from the lugs 224 of the left hand side locker gear 219.

The length of the torque limiter pins, the clearance between the left hand case 273 and the lock plate housing 271, and the clearance between the lock plate housing 271 and the right hand housing 211 are selected to contain the sheared torque limiter pins 274 within an area that does not contaminate other moving parts of the differential. And, the torque limiter pins 274 are preferably designed not to explode or create excessive debris upon shearing.

Figure 13A:
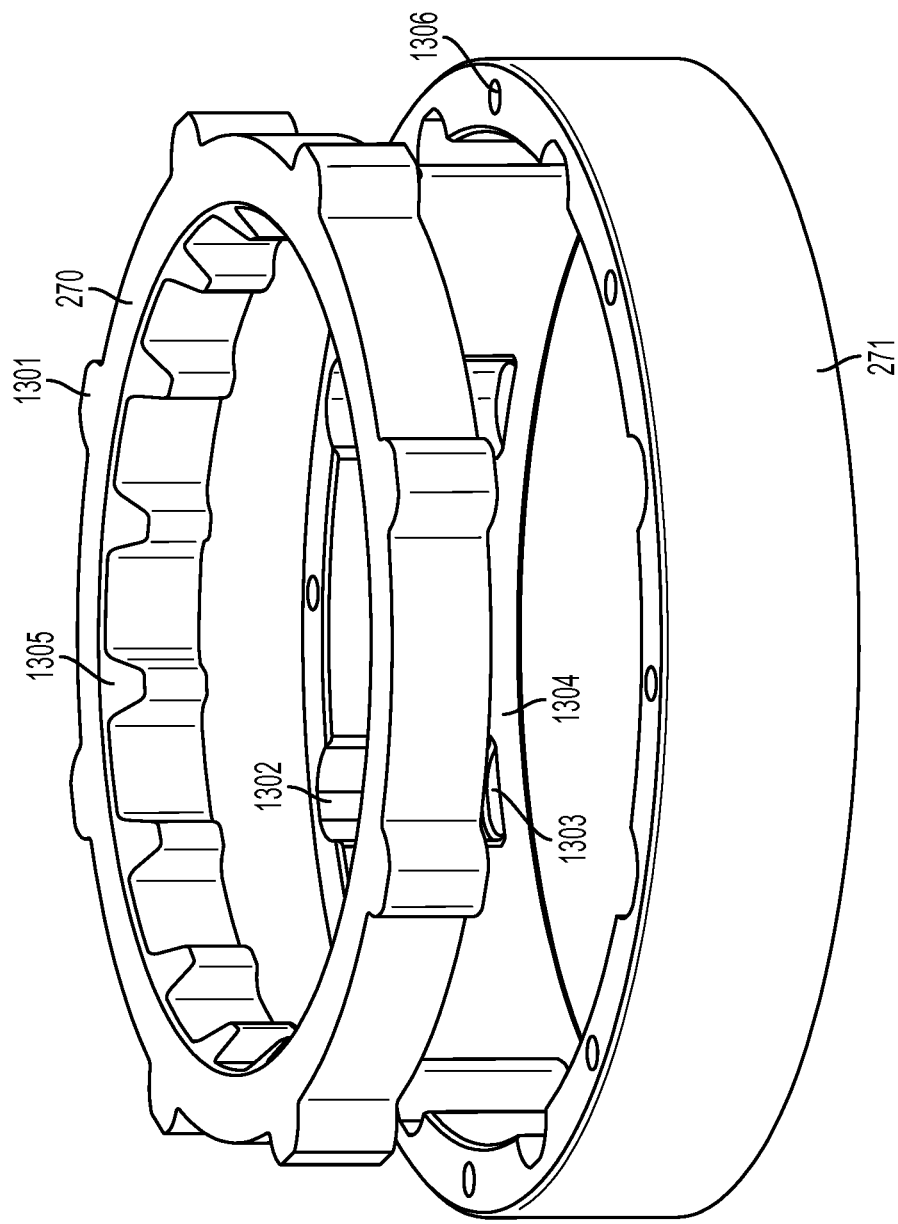
FIG. 13A is a first view of a collar and collar housing of the second embodiment.
Figure 13B:
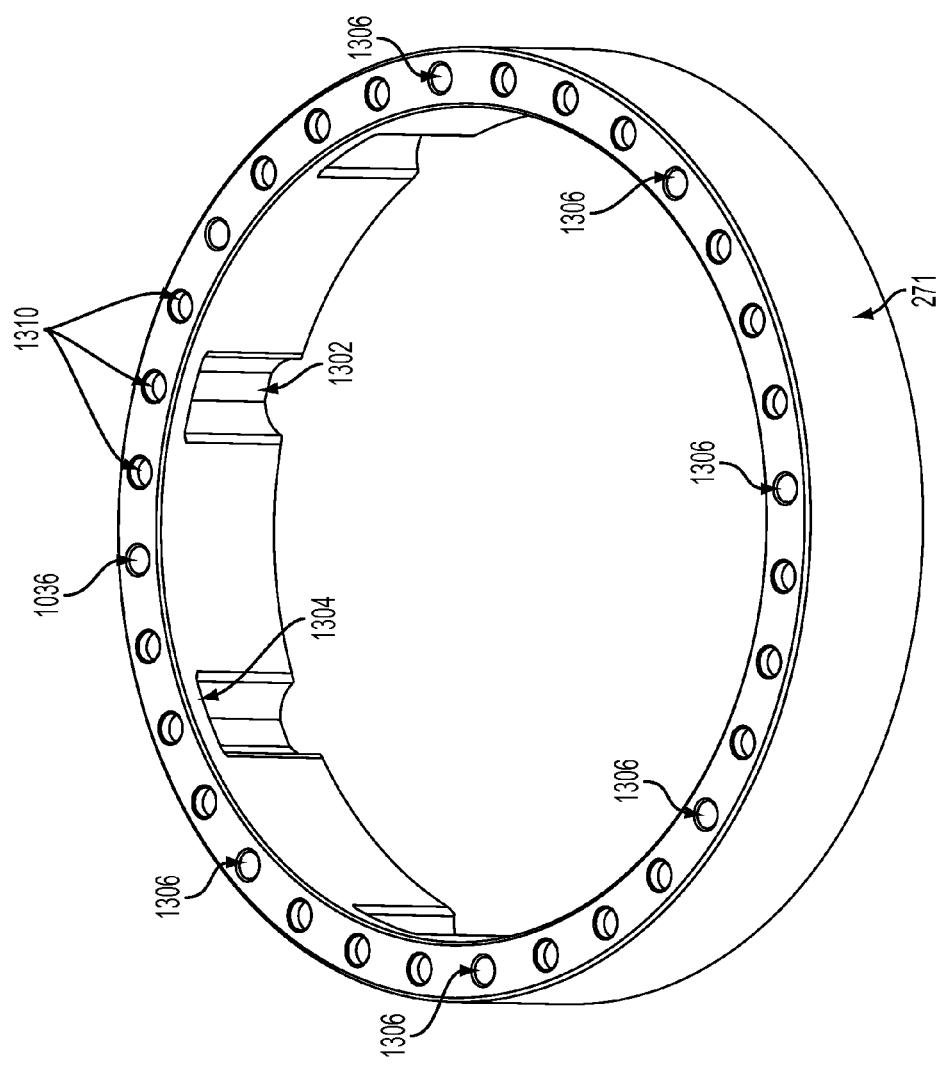
FIG. 13B is a second view of the collar housing.
Figure 14:
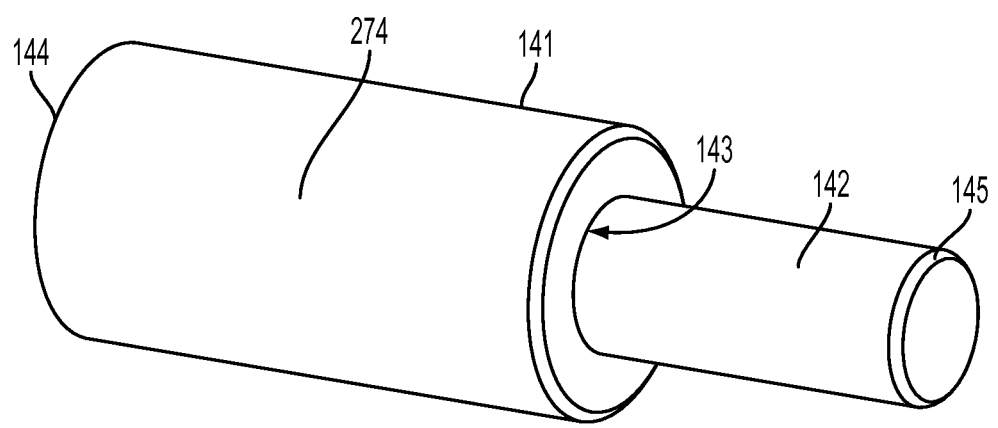
FIG. 14 is a view of a torque sensitive pin of the second embodiment.
Figure 15:
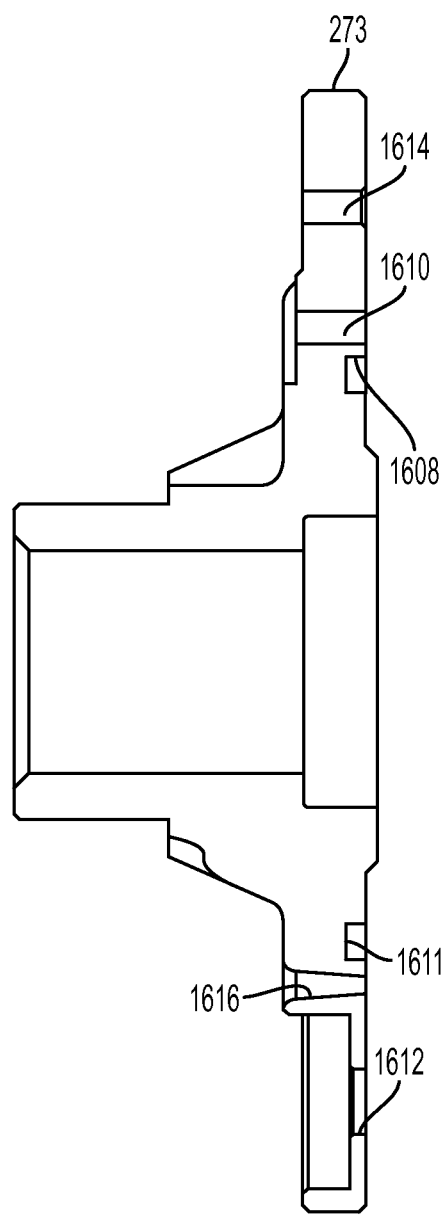
FIG. 15 is a cross-section of the left-hand case of the second embodiment.
Figure 16:
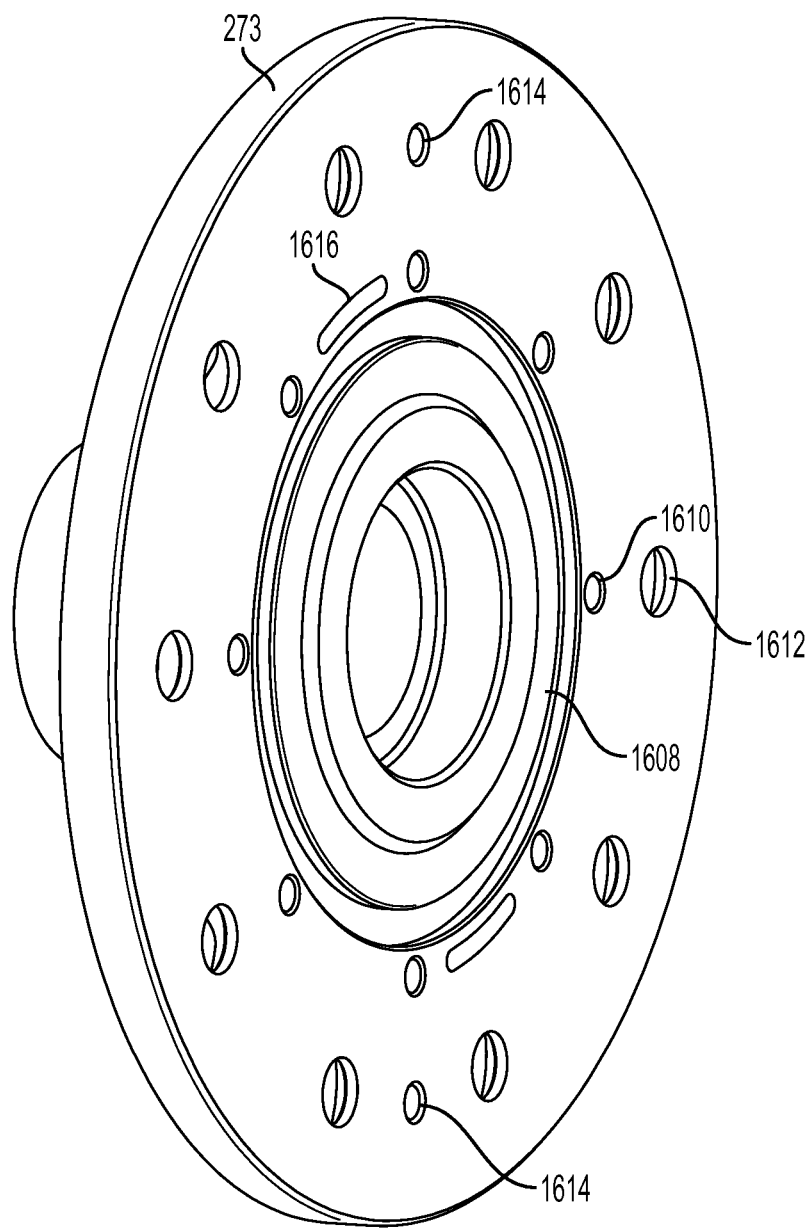
FIG. 16 is an inner-side view of the left-hand case of the second embodiment.

FIGS. 13A and 13B show the lock plate 270 and lock plate housing 271 in more detail. The lock plate 270 has coupling ears 1301 for sliding in recesses 1302 of the lock plate housing 271. The recesses 1302 do not have to span the whole length of the lock plate housing 271, and a stop 1303 may be provided. The wave spring 261 may abut the circumferential rim 1304 provided on the interior of the lock plate housing so as to be inward of the stop 1303. Abutting the wave spring in this manner may alleviate the need for an amount of damping depth in the left hand case, thereby enabling the wave spring recess 1608 to be shallower. A wave spring stop 1611 forms a bottom of the wave spring recess 1608 for the wave spring 261 to seat against.

In addition to abutting the rim 1304, the wave spring 261 biases the lock plate 270 away from stop 1303, away from the left hand case 273, and towards the ramp plate 253. With this biasing, when the differential is in an open mode, the lock plate teeth 1305 do not engage side gear lugs 224 and the lock plate 270 pushes the push rods 247 towards valleys of the ramp plate 253. In a locked mode, the wave spring 261 is compressed, and peaks of the ramp plate 253 push the push rods 247, and the push rods 247 push the lock plate 270 towards the left hand case 273 so that the lock plate teeth 1305 engage the side gear lugs 224.

The lock plate 270 of FIG. 13 does not show a draft on the lock plate teeth 1305, though such a draft may be provided, as above.

The lock plate housing 271 additionally has pin holes 1306. The pin holes 1306 may pass through the lock plate housing 271, since the pin springs 272 may abut the right hand case 211. However, to avoid friction caused when the lock plate housing 271 is free to rotate, the pin holes 1306 may partially extend into the lock plate housing 271, so that the pin springs 272 span between a bottom of the pin holes 1306 and an end of a torque limiter pin 274. The pin holes 1306 enable a slide-fitting with the torque limiter pins 274 and the clearance between the pin holes 1306 and the torque limiter pins 274 is designed to account for a bending stress. As above, the lubricating fluid in the differential may assist with smooth sliding between parts.

FIG. 13B shows an opposite side of the lock plate housing 271. The view includes pin holes 1306 and a plurality of recesses 1310 spaced between each of the pin holes. The recesses 1310 align with indexing slots 1616 in the left hand case 212. Should the torque limiter pins 274 shear, the lock plate housing 271 becomes free to rotate in the right hand case 211. This rotation is possible even if the wave spring 261 is able to disengage the lock plate 270 from the side gear lugs 224. Because of this ability to rotate, the pin holes 1306 of the lock plate housing 271 may no longer align with the torque pin holes 1610 of the left hand case. Thus, when the torque limiter pin heads 141 are unscrewed from the left hand case 212, the pin springs 272 may not eject out the debris. Therefore, a user may manually turn the lock plate housing 271 by putting a rod, screwdriver, or other prodding device into an available recess 1310 and by using the prodding device to turn the lock plate housing in to alignment for proper debris ejection. This design enables the differential to be serviced without disassembling the differential. It is possible to replace the torque limiter pins after draining the lubricating fluid from the housing surrounding the pinion and ring gear and removing only an access panel of that housing.

The lock plate 270 is in the torque path of the differential and is critical for locking the locker gear 219 for rotation with the left hand case 212, and thus locking the right rear axle 112 rotation with the left rear axle 111 rotation. Hence, the differential can only operate in a locked mode if the lock plate housing 271 is braced by the torque limiter pins 274 and the lock plate 270 is engaged with the locker gear 219. If an amount of torque above a predetermined value pushes on the lock plate 270, the lock plate housing 271 can rotate and shear the torque limiter pins 274. The lock plate housing 271, and thereby the lock plate 270, is free to rotate in the right hand case 211. The wave spring can push the lock plate 270 away from an engaged position with the lugs 224 of the locker gear 219 and the differential operates in the open mode.

The torque limiter pins 274 are designed in size and number according to the torque capacity of the system and the torque limiter pins are designed to shear before other components within the drive axle and differential fail via torsion or shearing. For example, the torque limiter pins 274 may shear under a pure shear condition. That is, the torque limiter pins may fail due to shear loads or shear stresses only. Ideally, the applied loads due to torque on the pins are perpendicular to axis of the pins so that no other loads like bending, torsion, impact etc. act on the pins. The ultimate strength of the torque limiting system may match the yield strength of the axle shaft material or the yield strength of the lock collar material. In other words, when the axle shaft or lock collar should yield, the torque limiting pins 274 instead shear.

The torque limiter pins 274 have an end face, which may have a groove or other recess to enable screw-in coupling with the left hand case 273. The pin head 141 may be partially or fully threaded for fixedly coupling to the left hand case 273. The pin body 142 may be shorter than the pin body 202, but in any case, may terminate with a beveled end 145. A shear location, or neck, 143 may be provided between the pin head 141 and the pin body 142. The shear location 143 may comprise a groove, which may be circumferential, to facilitate shearing along a particular plane of the torque limiter pin 274. The neck may also have the same diameter as the pin body.

Similar to the above examples, it is possible to describe the shear stresses on the torque limiter pins by contrasting the diameter of the pin body, the number of pins, and the shear stress. That is, torque loads may be accommodated by varying the number of pins used, the relative diameters of the pin head, pin body and or pin neck, and by the use or non-use of a groove at the interface of the pin head and pin body. In addition, varying the distance of the pins from the central axis (A or B) can also impact the torque load accommodated before shearing.

Because the lock plate housing 271 should be stationary with respect to unsheared torque limiter pins, and the lock plate housing should not move along the length of the torque limiter pins, pin bending stress and pin deflection considerations are reduced from the first embodiment.

Once the torque limiter pins 274 shear, in order to eject the bodies 142 out of the lock plate housing 271, the pin heads 141 are unscrewed from the left hand case 273. To facilitate alignment of the sheared debris with the openings 1610, the lock plate housing 271 is indexed, as above, with respect to the left hand case 273 so that the pin holes 1306 align with the torque pin holes 1610. Once alignment is achieved, the compressed pin springs 272 eject the pin bodies 142. New torque limiter pins may then be installed without disassembling the differential from the pinion and ring gear housing, without further adjustment to the left and right hand cases 273 and 211, and without uninstalling the axles, bearings, etc.

Additionally, the sheared torque limiter pins may be removed by unthreading the pin heads 141. Then, constrain the differential rotation manually and constrain the right hand axle shaft from rotation. Next, turn the ramp plate 253 in either direction, first by activating the stator coil which constrains the ramp plate rotation and then rotate the ring gear which can be done manually, to overcome wave spring 261 force. This can be done with or without rotation of the left hand axle shaft. As the ramp plate pushes against push rods 274, the lock plate 270 can engage the lugs 224. Rotating the left hand axle will then rotate the locker gear, which will rotate the lock plate 270 and the lock plate housing 271. The pin holes 1306 may then be aligned with the empty torque pin holes 1610, and the tensed pin springs 272 may eject the slide-fitted sheared pin bodies 142.

Other implementations will be apparent to those skilled in the art from consideration of the specification and practice of the examples disclosed herein. It is intended that the specification and examples be considered as exemplary only, with a true scope and spirit being indicated by the following claims.

What is claimed is:

1. A selectively lockable differential, comprising:
   an outer housing;
   a first side gear comprising first gear teeth and gear lugs;
   a second side gear comprising second gear teeth;
   a pinion shaft;
   two pinion gears rotationally coupled to the pinion shaft, each pinion gear comprising pinion gear teeth coupled to the first gear teeth and the second gear teeth;
   a collar comprising collar teeth for selectively engaging the gear lugs of the first side gear; and
   a plurality of torque sensitive pins operatively coupled through the outer housing and configured to shear when torque to the first side gear exceeds a predetermined value.

2. The differential of claim 1, wherein the collar further comprises coupling ears and the differential further comprises a collar housing coupled to the torque sensitive pins, the collar housing comprising coupling recesses for receiving the coupling ears, the collar housing at least partially surrounding the collar.

3. The differential of claim 2, further comprising an actuator and push rods, wherein the actuator is configured to selectively push the push rods towards the collar, and when the push rods push the collar, the coupling ears slide in the coupling recesses and the collar teeth engage with the gear lugs.

4. The differential of claim 1, further comprising at least one spring between the outer housing and the collar, the at least one spring biased to push the collar teeth away from the gear lugs.

5. The differential of claim 1, further comprising an actuator and push rods, wherein the actuator selectively pushes the push rods towards the collar, and when the actuator pushes the push rods towards the collar, the collar slides in the outer housing and the collar teeth engage with the gear lugs.

6. The differential of claim 1, wherein each torque sensitive pin comprises a head with a threaded portion and a body with a smooth portion, wherein the outer housing comprises a plurality of threaded openings, wherein each of the plurality of threaded openings receives a corresponding threaded portion of one of the plurality of torque sensitive pins, wherein the collar further comprises a plurality of collar holes, wherein each of the plurality of collar holes receives a corresponding smooth portion of one of the plurality of torque sensitive pins, and wherein the collar is slidable on the smooth portions to selectively engage and disengage the gear lugs and the collar teeth.

7. The differential of claim 2, wherein the collar housing further comprises a plurality of holes, wherein each hole receives a corresponding one of the plurality of torque sensitive pins, wherein the differential further comprises a plurality of pin springs, and wherein each hole houses a corresponding one of the plurality of pin springs in abutment with the corresponding torque sensitive pin.

8. The differential of claim 7, wherein each torque sensitive pin comprises a head with a threaded portion and a body with a smooth portion, wherein the outer housing comprises a plurality of threaded openings, wherein each of the plurality of threaded openings receives a corresponding threaded portion of one of the plurality of torque sensitive pins, wherein each collar housing hole receives a corresponding smooth portion of one of the plurality of torque sensitive pins, and wherein the pin springs are biased to push the smooth portions out of the holes.

9. The differential of claim 7, wherein:
the outer housing comprises at least one slot,
the collar housing further comprises a plurality of recesses distributed between each of the plurality of holes,
the collar housing is seated in the outer housing such that the recesses are accessible through the at least one slot, and
the collar is seated in the collar housing.

10. The differential of claim 1, wherein each torque sensitive pin comprises a head, a neck, and a body, and the neck has a diameter that enables the pin to shear at the neck before any other location on the torque sensitive pin.

11. The differential of claim 1, wherein each torque sensitive pin comprises at least a head interfaced with a body, wherein the distance between the outer housing and the collar is selected to ensure that each torque sensitive pin shears in an area at or near the interface of the head and the body, and wherein, when the torque sensitive pins shear, the collar is rotatable in the outer housing.

12. The differential of claim 2, wherein each torque sensitive pin comprises at least a head interfaced with a body, wherein the distance between the outer housing and the collar housing is selected to ensure that each torque sensitive pin shears in an area at or near the interface of the head and the body, and wherein, when the torque sensitive pins shear, the collar housing is rotatable in the outer housing.

13. The differential of claim 1, wherein, when the differential receives torque, each torque sensitive pin is configured to shear before the collar teeth or first gear teeth yield.

14. The differential of claim 1, wherein the collar teeth have a draft angle and the gear lugs have a draft angle, and the collar teeth draft angle is complementary to the gear lug draft angle.

15. A vehicle driveline comprising the selectively lockable differential of claim 1, the driveline further comprising:
a torque transmission system operatively coupled to transmit torque from an engine to the selectively lockable differential;
a first axle operatively coupled to the first side gear; and
a second axle operatively coupled to the second side gear,
wherein, when the differential receives torque above a predetermined value, each torque sensitive pin shears before the first axle or the second axle shears or before the first axle or the second axle yields to torsion.

16. The differential of claim 5, wherein the outer housing comprises:

a first housing half coupled to the collar via the torque sensitive pins; and
a second housing half housing the actuator and the push rods.

17. The differential of claim 3, wherein the outer housing comprises:
a first housing half coupled to the collar housing via the torque sensitive pins; and
a second housing half housing the actuator and the push rods.

18. A selectively lockable differential, comprising:
an outer housing;
a first side gear comprising first gear teeth and exterior gear lugs;
a second side gear comprising second gear teeth;
a pinion shaft;
two pinion gears rotationally coupled to the pinion shaft, each pinion gear comprising pinion gear teeth coupled to the first gear teeth and to the second gear teeth;
a collar comprising interior collar teeth for selectively moving towards and away from the first gear teeth and towards and away from the gear lugs, the collar configured to selectively engage the gear lugs of the first side gear; and
a plurality of torque sensitive pins operatively coupled through the outer housing, operatively coupled to the collar, and configured to shear when torque to the first side gear exceeds a predetermined value.

19. The differential of claim 18, wherein the collar further comprises a plurality of holes, wherein each hole receives a corresponding one of the plurality of torque sensitive pins, wherein each torque sensitive pin comprises a head and a body comprising a smooth portion, wherein the outer housing comprises a plurality of openings, wherein each of the plurality of openings receives a corresponding head of one of the plurality of torque sensitive pins, wherein each collar hole receives a corresponding smooth portion of one of the plurality of torque sensitive pins, and wherein the collar is movable on smooth portions of the torque sensitive pins.

20. The differential of claim 19, further comprising a spring between the outer housing and the collar, wherein the spring is biased to push the collar away from the outer housing and towards the first gear teeth.

21. The differential of claim 18, further comprising an actuator comprising mechanisms to push the collar away from the first gear teeth and in to engagement with the gear lugs.

22. A selectively lockable differential, comprising:
an outer housing;
a first side gear comprising first gear teeth and exterior gear lugs;
a second side gear comprising second gear teeth;
a pinion shaft;
two pinion gears rotationally coupled to the pinion shaft, each pinion gear comprising pinion gear teeth coupled to the first gear teeth and to the second gear teeth;
a collar comprising interior collar teeth for selectively engaging the gear lugs of the first side gear;
a collar housing in the outer housing, the collar housing surrounding the collar; and
a plurality of torque sensitive pins coupling the outer housing to the collar housing,
wherein the torque sensitive pins are configured to shear when a torque load on the torque sensitive pins exceeds a predetermined value, and, when the torque sensitive pins shear, the collar housing is rotatable in the outer housing.

* * * * *